March 16, 1937. W. H. RADFORD 2,073,852
DRIVE CONNECTING LINK
Filed May 31, 1935 2 Sheets-Sheet 1

INVENTOR
William H. Radford
BY Charles M. Fryer
ATTORNEY

March 16, 1937.  W. H. RADFORD  2,073,852
DRIVE CONNECTING LINK
Filed May 31, 1935  2 Sheets-Sheet 2

INVENTOR
William H. Radford
BY Charles M. Fryer
ATTORNEY

Patented Mar. 16, 1937

2,073,852

UNITED STATES PATENT OFFICE 2,073,852

DRIVE CONNECTING LINK

William H. Radford, Peoria, Ill., assignor to Caterpillar Tractor Co., San Leandro, Calif., a corporation of California Application May 31, 1935, Serial No. 24,345

10 Claims. (Cl. 64—12)

The present invention relates to a drive connecting link or coupling, and particularly to a resilient or elastic link to be used in mechanisms where it will absorb operating stresses, such as shocks caused by sudden starting and stopping, to thereby relieve such mechanisms from undue stresses; and where it will readily flex or yield to compensate for original or subsequent misalinement of the mechanism parts which are connected by the link.

In connections between a driving member and a driven member, such as, for instance, between a flywheel and a driving clutch which are movably coupled together by means of a plurality of annularly disposed spaced links, stresses and shocks are continually received and transmitted between the coupled parts when starting or stopping takes place. The rigid metal couplings or connecting links heretofore employed between the driving member and the drive establishing means will not sufficiently absorb such shocks and stresses. Furthermore, where a misalinement exists between the coupled parts, there will be a tendency to distribute the load centrifugally to one of the links or couplings at a time. It is, therefore, desirable to provide flexible couplings instead of metal couplings, so that when the drive is stopped or started, such couplings may yield to provide a cushioning action or means, and also a means for taking care of any misalinement so that centrifugal placement of load on only one coupling will be avoided.

Leather links have been employed for this purpose, but not only is this material expensive for the purpose employed, but leather links provide manufacturing problems, as the links must be thick for strength and they consequently have to be formed out of a plurality of sheets of leather, placed side by side, to build up the necessary width of the link. Furthermore, it is difficult to obtain leather of a quality which will provide a desired amount of resiliency or elasticity consistently and which will not be subject to temperature variations. Fabric links have also been employed, but they have been found to be unsatisfactory because of insufficient strength and elasticity.

My invention is designed to obviate the difficulties encountered with respect to metal, or only slightly stretchable links of fabric or leather, heretofore employed; and it, therefore, has as an object the provision of an improved flexible link having the requisite degree of resiliency or elasticity enabling the link to minimize transmission of shock between the parts connected by the link, and at the same time to flex or stretch so as to take care of any misalinement which might exist between the parts connected.

Another object of my invention is the provision of an improved resilient link, of the character described, of economical and strong construction.

Another object of my invention is the provision of an improved resilient link or coupling, of the character described, which contains means for limiting the degree of stretch of the link, to thereby preclude too great an extent of relative movement between the parts connected by the link and thereby avoid back-lashing or whipping which might otherwise occur during stopping or starting of the drive, or even during transmission of the drive as a result of the inherent pulsating nature of the drive transmitted by a prime mover such as an internal combustion engine.

A further object of my invention is the provision of such stretch limiting means, in an improved link of the character described, which will also serve to reenforce the link in tension, when the link is subjected to the stretching forces.

An additional object of my invention is the provision of an improved releasable drive establishing mechanism between a prime mover, such as an internal combustion engine, and the mechanism to be driven thereby, having the improved links or couplings of my invention incorporated therein.

Other objects of my invention will appear as the description progresses.

In general, the link of my invention is flexible and truly elastic or resilient, so that after being stretched or compressed it has the property of restoring itself to its original shape. The preferred link consists essentially of a block of suitable resilient or elastic material, such as rubber vulcanized in the usual manner, and having spaced means to enable connection of the link in the drive establishing mechanism. Reenforcing means, preferably in the form of spaced layers of a flexible and but slightly stretchable material such as strong fabric, is looped about the spaced connecting means within the block of material, to limit or control the degree of stretch of the link and to reenforce the link in tension. The invention is shown embodied in a clutch mechanism, but it may, of course, be employed in other driving connections where flexibility accompanied by durability is desired.

Reference will now be made to the drawings for a more detailed description of the invention:

Figure 1:
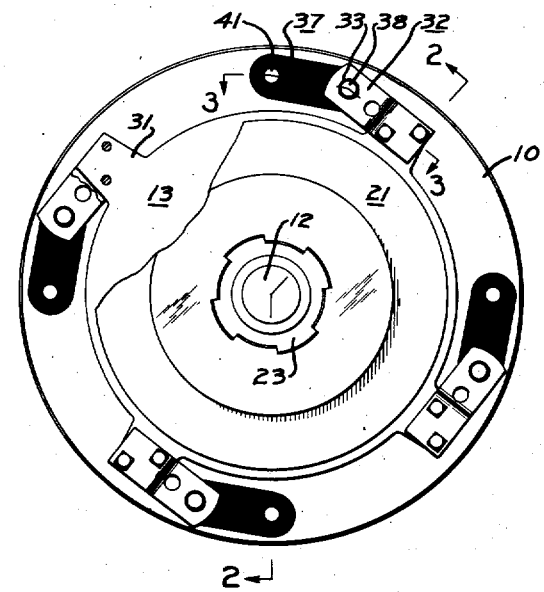
Fig. 1 is a side elevation of a clutch mechanism embodying the resilient drive connecting links of my invention. Parts are shown broken away to disclose more clearly the construction.
Figure 2:
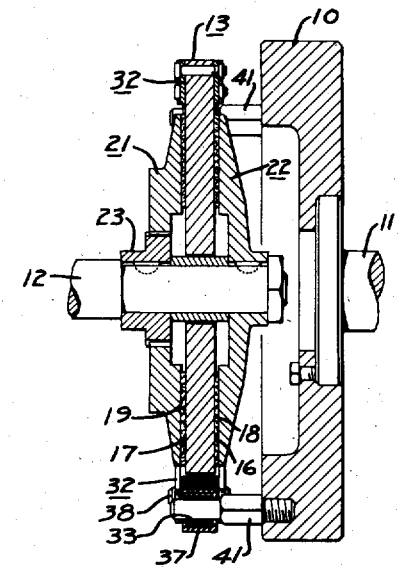
Fig. 2 is a sectional view taken along the lines 2—2 of Fig. 1.

Referring to Figs. 1 and 2 of the drawings, the clutch mechanism is shown as including an engine flywheel 10 rotated from the engine through crankshaft 11. Adapted to rotate with the flywheel, and loosely journalled about a driven shaft 12 connected with transmission mechanism, not shown, is a clutch plate 13 having suitably lined clutch faces 16 and 17 for engaging corresponding faces 18 and 19 on clutch plates 21 and 22, to thereby transmit a drive to shaft 12. Clutch plate 22 is fixedly keyed or splined on shaft 12 for rotation therewith; and plate 21 is mounted on fixed collar 23 for rotation therewith, and for axial displacement with respect thereto and with respect to opposed clutch plate 22. Engagement of the clutch plates may be effected by any suitable clutch control mechanism, such as the mechanism shown in Best Patent No. 1,584,425, to provide for engagement of the clutch to establish a drive therethrough to shaft 12.

A mechanism such as the clutch mechanism described and illustrated offers conditions which my invention is adapted to overcome. Thus, the starting and stopping of a clutch mechanism imposes severe stresses upon all connecting parts in which some compensation for such stresses has not been made. In the mechanism shown, most of these stresses or shocks take place between the flywheel 10 and the clutch plate 13. A second condition exists because of misalinement which it is extremely difficult and expensive to obviate in assembling the clutch controlled shafts. This becomes especially true in vehicles such as track-type tractors or other vehicles in which the shafts are subjected to severe torsional strains.

Figure 3:
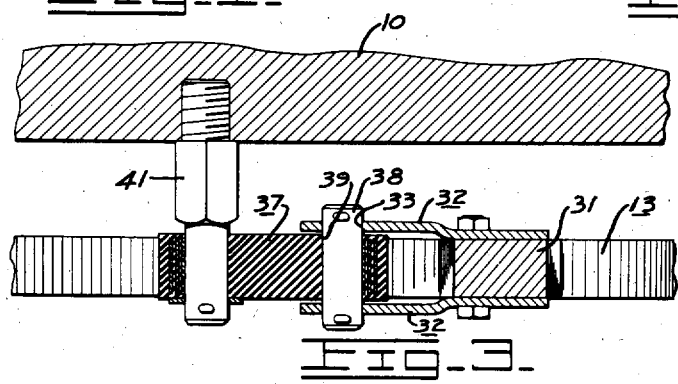
Fig. 3 is a fragmentary sectional view taken along the lines 3—3 of Fig. 1.

To minimize these shocks or stresses between driving flywheel 10 and driven clutch plate 13 of the drive establishing means or clutch during engagement or disengagement thereof, and to overcome any misalinement which may occur between shafts 12 and 11 or plate 13 and flywheel 10, the resilient connections of my invention are shown provided between the flywheel 10 and clutch plate 13. As seen in Figs. 1 and 3, formed on clutch plate 13 are a plurality of bosses 31 having spaced shackles 32 suitably mounted thereon. Shackles 32 are struck out at their unsecured ends and are provided with apertures 33 corresponding with apertures 39 in resilient links 37 which are movably secured to the shackles by means of pivot pins 38 or similar connecting means. The opposite ends of resilient links 37 are likewise movably connected to the flywheel by apertures 36 for receiving pivot studs 41 threaded in flywheel 10.

Various forms of my improved drive connecting link or coupling, which can be employed in this drive connection, and in drive connections of a like nature, are shown in Figs. 4 through 8.

In each instance, the link consists essentially of a mass or block 40 of elastic or resilient material having an ellipsoidal shape and formed essentially of cured or vulcanized rubber. The rubber retains all of its inherent elasticity and durability, and has embedded therein a flexible reenforcing material designated generally as 42, having less resiliency than the rubber to thereby serve to limit the stretch of the link. All forms of the link have a suitable strong fabric material looped about spaced apertures 36 and 39 to provide a plurality of overlying separated layers of fabric with rubber layers therebetween. Thus, in effect, a laminated structure of rubber and fabric is provided about link connecting apertures 36 and 39; the links having an inner core 43 and an outer casing 44 consisting of rubber. The inner layer of the reenforcing fabric 42 looped about apertures 36 and 39, is protected by a wall 45 of rubber so that moisture or lubricant will not come in contact with it and thereby render it inefficacious. Furthermore, as can be seen from Fig. 5, the transverse width of the embedded fabric is less than that of the rubber block to provide, at each side of the link a protecting wall 46 of rubber for the edges of the fabric. Thus, all of the fabric layers are completely embedded in the rubber block, so as to be covered by the rubber as protection against substances which if accessible to the fabric might cause deterioration thereof.

Figure 4:
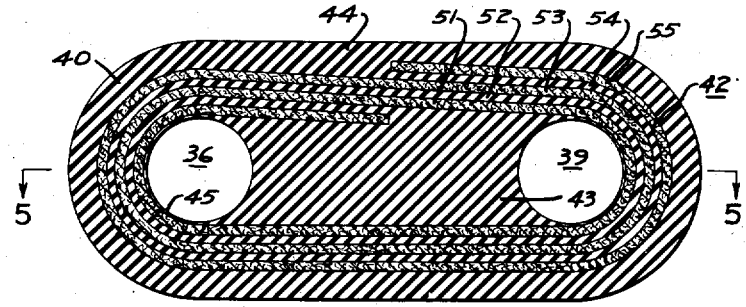
Fig. 4 is a longitudinal vertical sectional view through one form of link.

In the form shown in Fig. 4, a single strip of fabric is employed which is looped about apertures 36 and 39 a plurality of times. With respect to the form shown in Fig. 6, three separate overlying strips of fabric are employed. In each of these forms of couplings, the rubber block provides the necessary elasticity, and the fabric provides a means for controlling or limiting the extent of this resiliency to preclude too great an extent of stretch when the clutch drive is established, and thereby avoid back-lashing or whipping between the driving and the driven parts 10 and 13. Also, the fabric serves to reenforce the rubber when it is subjected to tension forces during the drive. In this connection, it should be noted that the fabric, depending upon the number of plies or layers employed, the looseness with which it is placed in the rubber block, and the thickness and weave of the material, has a certain amount of resiliency of a degree considerably less than that of the rubber. Consequently, when the drive connecting link or coupling is subjected to strain, whether from starting or stopping, or from misalinement, the fabric will yield to allow the characteristics inherent in the rubber to provide the desired resiliency. Yet the degree of stretch is substantially controlled or limited, as the fabric, when the link is under load stresses, will tend to restrain or limit the extent of yielding or stretch of the rubber to within reasonable limits.

Figure 6:
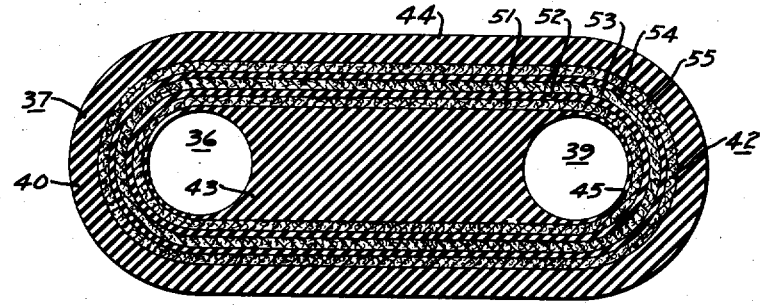
Fig. 6 is a longitudinal vertical sectional view through a modified form of link.
Figure 7:
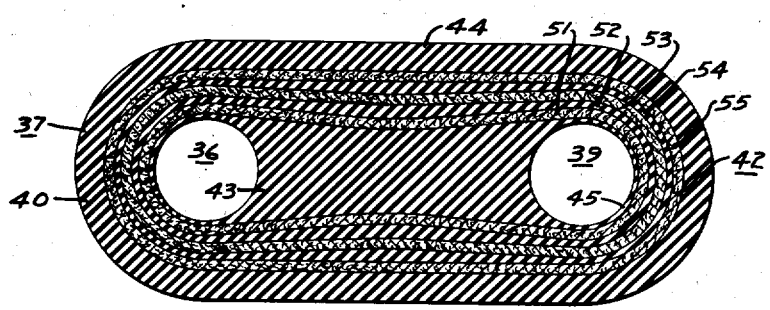
Fig. 7 is a longitudinal vertical sectional view through the preferred form of link.
Figure 8:
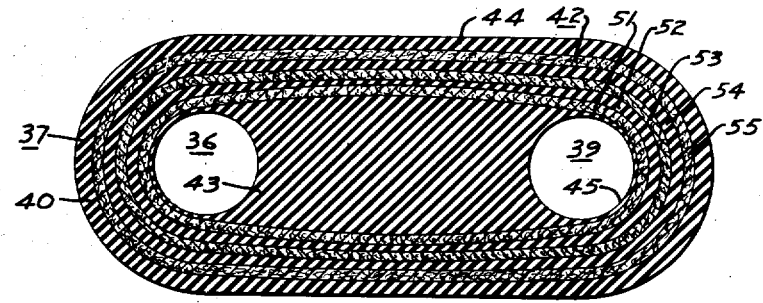
Fig. 8 is a longitudinal vertical sectional view through a modification of the preferred form of link.

Figs. 7 and 8 illustrate the preferred manner of embedding the flexible material in the rubber drive connecting link. In the form shown in Fig. 7, the inner layer of fabric 51 is bowed inwardly intermediate the connection receiving apertures 36 and 39. The next layer is also bowed inwardly but to a lesser degree than that of the inner layer, while the outer layer is substantially in a straight line intermediate the two apertures. In the form of Fig. 8, the inner layer is bowed outwardly intermediate the apertures 36 and 39, the next layer is similarly bowed but with a less degree of curvature, and the outer layer is bowed only slightly. In all of the forms shown in Figs. 4, 6, 7, and 8, the layers are spaced from one another with respect to the direction of stretch, that is, the layers are in an overlying relationship between and with reference to opposite parts of the link which are brought together upon stretching thereof.

Figure 5:
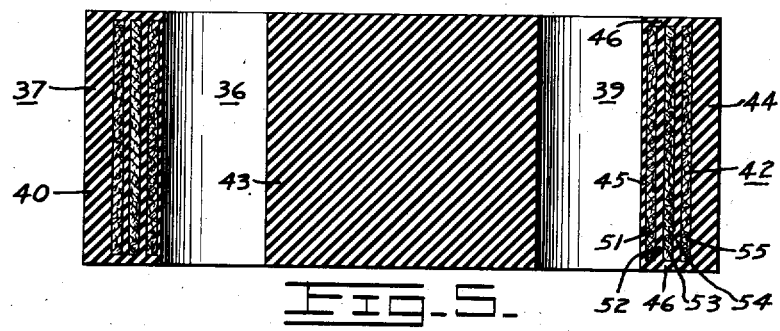
Fig. 5 is a horizontal sectional view of the link taken along the line 5—5 in Fig. 4.

The bowing of the layers, in both of the preferred forms, has been made greater toward the core 43 of block 40, since the tendency to stretch when the drive connection is first subjected to stresses is initially greatest adjacent the apertures 36 and 39, and gradiently decreases toward the periphery of the link. Therefore, when the link is subjected to tension as the clutch drive is established and during pulsations of the drive, the parts of the link subjected to the most initial stretching can yield or straighten out without being at first impeded by the inner layer of fabric and without straining such inner layer. Because of the gradient bowing of the fabric layers in accordance with the different degrees of initial stretching in the link, increased resiliency and flexibility compared to the modifications of Figs. 4 through 6 is thereby provided. Also, when the bowed portions of the inner layers of the fabric straighten out as the link is stretched, the rubber layers between the bowed portions will compress slightly in a transverse direction, to control stretching of the rubber in a longitudinal direction. This distributes all the load quickly and uniformly to all the layers of fabric at the same time, thereby providing a means for preventing any one fabric layer from carrying all the load which might result in rupture thereof, and providing a suitable compensating means for varying degrees of stretch.

Depending on the size of the coupling and the degree of stretch desired, all forms of drive couplings illustrated in the drawings may have any suitable number of pieces of the embedded stretch controlling and reenforcing material, and any suitable number of layers. Also, other suitable stretch controlling material may be employed, such as flexible wire mesh preferably bowed in the manner disclosed in Figs. 7 and 8.

The links or couplings may be formed by vulcanizing the rubber and embedded material in any desired manner in suitable vulcanizing molds. One satisfactory method comprises providing a split mold with pins substantially the diameter of apertures 36 and 39. About these pins are placed plies of the material such as fabric and rubber, to provide the laminated fabric and rubber structure. In Figs. 4, 6, and 7, fabric plies are indicated by reference characters 51, 53, and 55, between which are interposed plies of rubber 52 and 54. When the fabric with the layers of rubber in between has been formed about the pins of the mold, the remaining rubber is forced into the mold to form the core 43 and the outside walls 42, and the whole mass is then cured or vulcanized together. In constructing the preferred forms of link as shown in Figs. 7 and 8, the desired curvature or bowing of fabric plies 51 and 53 may be obtained by initially bowing by hand the plies of rubber and fabric while in the mold, prior to forcing in of the remaining rubber and the subsequent vulcanization.

By the provision of the embedded reenforcing and stretch controlling material, a drive coupling is obtained in which a proper amount of stretch can take place. Thus, if a clutch in which a link or drive coupling of my invention is embodied, is engaged too quickly, the coupling will yield to minimize the shock caused by such engagement and prevent any damage to the parts of the transmission or similar mechanism driven by the clutch; and at the same time the stretch of the rubber is limited to prevent undesirable back-lashing or whipping between the parts connected by the coupling. It will also be seen that not only is a cushioning means provided but accurate alinement of clutch driven shaft and crankshaft is unnecessary, as a slight misalinement will be accommodated by the elastic and yieldable nature of the coupling.

I, therefore, claim as my invention:

1. A resilient drive connecting link consisting essentially of a mass of elastic material having a plurality of layers of reenforcing material therein for controlling the extent of stretching of the link when under load, said layers being spaced from another with respect to the direction of stretch and being arranged to effect uniform distribution of load to all of said layers when said link is under load.

2. A resilient drive connecting link consisting essentially of a mass of rubber having spaced means to provide for connection of the link, and means embedded within and completely covered by said mass of rubber for reenforcing said rubber when stretched under load comprising a plurality of layers of fabric looped about said spaced connection means and spaced from each other with respect to the direction of stretch of said link.

3. A resilient drive connecting link consisting essentially of a mass of elastic material, and means within said mass of material for limiting the extent of stretching of the link when under load and for reenforcing the link against such stretching comprising spaced layers of material, the layers being spaced from one another with respect to the direction of stretch of the link and being formed intermediate their end portions to distribute the load to all of said layers when said link is under load.

4. A resilient drive connecting link consisting essentially of a mass of rubber having spaced means to provide for connection of the link and having means therein for controlling the extent of stretching of the link when under load, said latter means comprising a plurality of overlying layers of stretch limiting material separated by layers of rubber, the layers of rubber and material being in said overlying relationship between and with reference to opposite parts of said link which are brought together upon stretching thereof.

5. A resilient drive connecting link consisting essentially of a mass of rubber having spaced means to provide for connection of the link, and a plurality of overlying layers of fabric material about said spaced connection means, and separated by layers of rubber, the layers of rubber and material being in said overlying relationship between and with reference to opposite parts of said link which are brought together upon stretching thereof.

6. A resilient drive connecting link consisting essentially of a mass of rubber having means therein for controlling the extent of stretching of the link when under load, said means comprising a plurality of overlying layers of stretch limiting material separated by layers of rubber, said layers of stretch limiting material being bowed gradiently to compensate for varying degrees of stretching within the link.

7. A resilient drive connecting link consisting essentially of a mass of rubber having spaced means to provide for connection of the link, and a plurality of overlying layers of fabric about said spaced connection means, and separated by layers of rubber, said layers of fabric being bowed gradiently intermediate said spaced connection means.

8. A resilient drive connecting link consisting essentially of a mass of rubber having spaced means to provide for connection of the link, and layers of stretch limiting material looped about said spaced connection means and spaced with respect to the direction of stretch of the link, said layers being arranged to distribute load uniformly to all said layers at the same time.

9. A resilient drive connecting link consisting of an inner core of rubber having spaced link connecting apertures, spaced fabric plies looped about said apertures, and plies of rubber filling the spaces, said fabric plies being bowed gradiently with the curvature of bowing greatest adjacent said core.

10. A resilient drive connecting link consisting essentially of a mass of elastic material having spaced means to provide for connection of the link, reenforcing means about said spaced connection means comprising layers of stretch limiting material, the layer adjacent said spaced connection means being formed to stretch to a greater degree than the remaining layers.

WILLIAM H. RADFORD.

CERTIFICATE OF CORRECTION.

Patent No. 2,073,852.

March 16, 1937.

WILLIAM H. RADFORD.

It is hereby certified that error appears in the printed specification of the above numbered patent requiring correction as follows: Page 3, second column, line 23, claim 3, before "another" insert the word one; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.

said layers of stretch limiting material being bowed gradiently to compensate for varying degrees of stretching within the link.

7. A resilient drive connecting link consisting essentially of a mass of rubber having spaced means to provide for connection of the link, and a plurality of overlying layers of fabric about said spaced connection means, and separated by layers of rubber, said layers of fabric being bowed gradiently intermediate said spaced connection means.

8. A resilient drive connecting link consisting essentially of a mass of rubber having spaced means to provide for connection of the link, and layers of stretch limiting material looped about said spaced connection means and spaced with respect to the direction of stretch of the link, said layers being arranged to distribute load uniformly to all said layers at the same time.

9. A resilient drive connecting link consisting of an inner core of rubber having spaced link connecting apertures, spaced fabric plies looped about said apertures, and plies of rubber filling the spaces, said fabric plies being bowed gradiently with the curvature of bowing greatest adjacent said core.

10. A resilient drive connecting link consisting essentially of a mass of elastic material having spaced means to provide for connection of the link, reenforcing means about said spaced connection means comprising layers of stretch limiting material, the layer adjacent said spaced connection means being formed to stretch to a greater degree than the remaining layers.

WILLIAM H. RADFORD.

CERTIFICATE OF CORRECTION.

Patent No. 2,073,852.

March 16, 1937.

WILLIAM H. RADFORD.

It is hereby certified that error appears in the printed specification of the above numbered patent requiring correction as follows: Page 3, second column, line 23, claim 3, before "another" insert the word one; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.

CERTIFICATE OF CORRECTION.

Patent No. 2,073,852. March 16, 1937.

WILLIAM H. RADFORD.

It is hereby certified that error appears in the printed specification of the above numbered patent requiring correction as follows: Page 3, second column, line 23, claim 3, before "another" insert the word one; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.